(12) United States Patent
Fereyre et al.

(10) Patent No.: US 7,471,323 B2
(45) Date of Patent: Dec. 30, 2008

(54) IMAGE SENSOR WITH RAPID READ CYCLE

(75) Inventors: Pierre Fereyre, Voreppe (FR); Thierry Ligozat, Grenoble (FR)

(73) Assignee: Atmel Grenoble (FR)

( * ) Notice: Subject to any disclaimer, the term of this patent is extended or adjusted under 35 U.S.C. 154(b) by 707 days.

(21) Appl. No.: 10/547,470

(22) PCT Filed: Mar. 5, 2004

(86) PCT No.: PCT/EP2004/050264

§ 371 (c)(1), (2), (4) Date: Aug. 30, 2005

(87) PCT Pub. No.: WO2004/084541

PCT Pub. Date: Sep. 30, 2004

(65) Prior Publication Data

US 2006/0227234 A1    Oct. 12, 2006

(30) Foreign Application Priority Data

Mar. 21, 2003    (FR) ................... 03 03511

(51) Int. Cl.
H04N 5/335 (2006.01)
(52) U.S. Cl. ............... 348/294; 348/298; 348/299; 348/302; 348/303; 348/311; 348/316; 257/215
(58) Field of Classification Search ........ 348/294, 348/298, 299, 302, 303, 311, 316; 257/215
See application file for complete search history.

(56) References Cited

U.S. PATENT DOCUMENTS

| | | | | |
|---|---|---|---|---|
| 5,801,850 A * | 9/1998 | Maki et al. | .................. | 358/483 |
| 7,002,630 B1 * | 2/2006 | Iizuka | ........................ | 348/322 |
| 2001/0033337 A1 * | 10/2001 | Sakuragi | ..................... | 348/302 |
| 2002/0154236 A1 | 10/2002 | Sakurai | | |
| 2003/0128279 A1 * | 7/2003 | Suzuki | .................... | 348/221.1 |
| 2003/0137594 A1 * | 7/2003 | Koizumi et al. | ............. | 348/308 |

FOREIGN PATENT DOCUMENTS

JP    06 121235 A    10/2002

* cited by examiner

*Primary Examiner*—David L Ometz
*Assistant Examiner*—Quang V Le
(74) *Attorney, Agent, or Firm*—Lowe Hauptman Ham & Berner, LLP

(57) ABSTRACT

The invention proposes an image sensor comprising a picture capture matrix having N rows and K columns of image dots, a read register at the free end of the K columns. In order to improve the read speed of the matrix, the invention proposes that the horizontal transfer into the read register be continued even while the vertical signals for shifting from one row to the other are operative, without however continuing the horizontal transfer while the transfer gate between columns and horizontal register is open. The unloading time of the horizontal read register therefore overlaps the time reserved for each vertical transfer step, instead of these times being added together. The gain in time, being repeated for each row, will be all the more significant the higher the number of rows. Means are provided for limiting the effect of the column transfer switching operations on the reading of the charges at the output of the read register.

14 Claims, 3 Drawing Sheets

IMAGE SENSOR WITH RAPID READ CYCLE

CROSS REFERENCE TO RELATED APPLICATIONS

Figure 1:
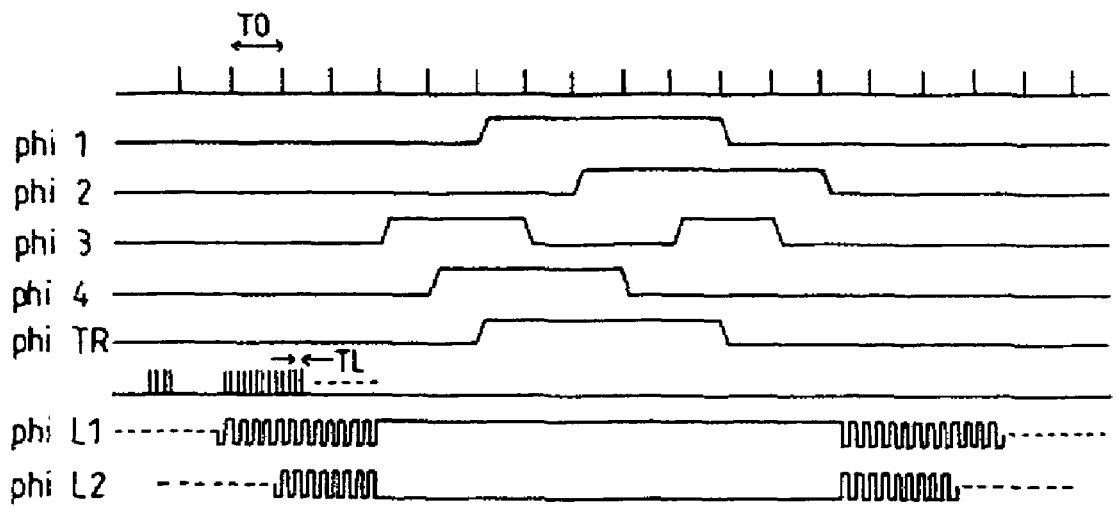

The present Application is based on International Application No. PCT/EP2004/050264, filed on Mar. 5, 2004, which in turn corresponds to FR 03/03511 filed on Mar. 21, 2003, and priority is hereby claimed under 35 USC § 119 based on these applications. Each of these applications are hereby incorporated by reference in their entirety into the present application.

FIELD OF THE INVENTION

The invention relates to electronic image sensors, and more particularly, to sensors comprising a large format image capture matrix (several thousand rows and several thousand columns of image dots).

BACKGROUND OF THE INVENTION

Large area matrices pose a particular problem which is that of the time required for reading the image recorded in the matrix: the matrix must be emptied row by row into a read register placed at the end of the columns of the matrix until all the rows have been emptied; but, between the unloading of one row of the matrix into the register and the unloading of the next row, the contents of the register must be read by emptying it stage by stage into a read circuit placed at the end of the register.

In order to obtain a high enough frame rate (for example, the typical frame rate of a video picture at 30 images per second), the read register must work at an extremely high rate and, at the same time, the column transfer phases must not take too long.

In order to improve its performance, it has already been proposed to divide the matrix, both horizontally and vertically, into two parts, hence into four quadrants, and to place an individual read register at the free end of the columns of each quadrant. There are therefore four read registers and the constraints on each register are the constraints corresponding to a matrix of reduced size.

Even when this disposition is used, it is not necessarily sufficient and accelerating the process of reading the image can be desirable.

The registers can also be provided with intermediate outputs instead of having a single output at the end of the register, but this results in additional topographical design constraints and multiplexing constraints for the different outputs of the registers.

The invention aims to propose a simple solution for the improvement of the read speed, which can furthermore be used in combination with the solutions that have just been presented (multiple registers and registers with multiple outputs).

In order to explain the invention, it is recalled that in a conventional image sensor:

the columns of the image capture matrix are each organized into column charge transfer registers for progressively shifting the charges of an image dot from one row to another within each column, each stage of the column register corresponding to an image dot;

each stage of the column register comprises several electrodes (typically four electrodes for a conventional matrix); the column charge transfer from one stage to the next, together with the transfer of the last row towards the read register, is performed over several successive clock pulses from a vertical scan timing clock; the clock pulses correspond to control signals for the various electrodes of the stage, in synchronization for the electrodes of same rank of all the rows of the matrix;

between the last row of dots of the image capture matrix and the read register situated at the end of the matrix columns, there is a transfer electrode that is controlled synchronously with the column transfer, in order to unload the charges from the last row into the read register at the same time as the charges advance from one row to the next in the rest of the matrix;

between two successive column charge transfers, time is allowed for successively emptying all the stages of the read register along a row, under the control of a horizontal scan timing clock; the frequency of the horizontal scan timing clock, for the transfer along a row, is much higher than the frequency of the vertical scan timing clock used for the column transfer.

The scan rates, both horizontal and vertical, cannot exceed certain values which are dictated by the stray capacitances and resistances of the electrodes and by the power of the amplifiers that switch, between a high level and a low level, the potentials applied to the electrodes. The read register control signals, timed at the horizontal scan rate, drive very small electrodes (those of the horizontal register) so the scan speed can be high. But the vertical scan timing clock is much slower owing to the fact that amplifiers need to simultaneously drive N electrodes (for N rows of the matrix) whose stray resistances and capacitances are large since each of these N electrodes occupies the whole width of the matrix.

FIG. 1 shows, in a simplified form, a conventional read-cycle timing diagram for an image capture matrix whose columns are arranged in a transfer register with four electrodes per row, and in which the transfer of the charges from one row of dots to the next uses ten pulses of a vertical scan timing clock of elementary period T0. A transfer over ten pulses is conventional for registers with four electrodes per stage operating in MPP (multi-pinned phase) mode. Other modes are possible that use a variable number of electrodes and a variable number of clock pulses to advance the column charge transfer by one row.

The first line of the timing diagram shows the pulses from the vertical scan timing clock, whose period is T0. The four following lines show the control signals phi1, phi2, phi3, phi4 of the four successive electrodes of a matrix row. All the electrodes of same rank of the various rows are controlled by the same signals, in other words the first electrode (rank 1) of any row is controlled by the signal phi1, the second electrode (rank 2) of any row is controlled by the signal phi2, and the same for the signals phi3 and phi4 which control all the third electrodes and all the fourth electrodes, respectively.

The sixth line of the timing diagram shows the control of an electrode, called the transfer electrode, situated between the last row of dots of the matrix and the horizontal read register. This transfer electrode is controlled by a control signal phiTR for periodically lowering, synchronously with the vertical shift of the charges from one row to another, a potential barrier created by this electrode between the columns and the read register; this lowering of the barrier causes the charges to be unloaded from the last row into the register, after which the potential barrier is raised again by the end of the pulse phiTR (falling to the low level) for the whole time that the horizontal transfer of the read register will last. The signal phiTR is generally the same as phi1.

The seventh line of the timing diagram shows the horizontal scan timing pulses, of period TL much shorter than T0 since the read register can perform a charge transfer along a row much faster than the column charge transfer. For a matrix of 1000 rows and 1000 columns, these periods are of the order of 2 microseconds for T0 and 25 nanoseconds for TL, which is not adhered to in FIG. 1.

The eighth and ninth lines of the timing diagram show symbolically the two signals phiL1 and phiL2 for controlling the horizontal register (conventionally a two-phase register with two electrodes per stage of the register); the switching of these signals is timed by the clock with period TL; the signals phiL1 and phiL2 are interrupted during the whole vertical transfer phase of a row, which lasts around 20 microseconds in this example; subsequently; they are subsequently restored for a new horizontal transfer.

It will therefore be understood that, on the one hand, the horizontal transfer signals phiL1 and phiL2 are activated K times, for emptying the horizontal register, if there are K columns to be read in the matrix (corresponding to K stages of the horizontal read register); then, a succession of pulses phi1, phi2, phi3, phi4, phiTR, such as is shown in FIG. 1, is established in order to transfer a new row of the matrix into the read register; then, the read register is emptied by K activations of the signals phiL1 and phiL2.

This process is repeated N times if there are N rows in the matrix. At the end, the matrix will have been completely read and a new image reception can take place.

SUMMARY OF THE INVENTION

In order to improve the read speed of the matrix, the invention proposes that the horizontal transfer into the read register be continued, even while the vertical signals for shifting from one row to another are operative, without however continuing the horizontal transfer while the transfer gate between columns and horizontal register is open. The time for transferring the horizontal read register therefore overlaps the time reserved for each vertical transfer step, rather than these times being added together. The gain in time is repeated for each row, which will be all the more significant the higher the number of rows.

Accordingly, the subject of the invention is an image sensor comprising a picture capture matrix having N rows and K columns of image dots, a read register at the free end of the K columns, and means for transferring, from one row to another and from the last row to the read register, charges corresponding to the image dots, with a transfer electrode between the last row of the matrix and the read register, each row of image dots comprising several electrodes of rank 1 to p, activated synchronously, such that the electrodes of same rank j (j=1 to p) of all the rows are activated by the same periodic control signal, the electrode of rank p being, among the electrodes of the same row, that which is the closest to the read register, means for controlling the read register being provided for carrying out a transfer of charge from the register towards a read circuit, for interrupting this transfer while a potential barrier under the transfer electrode is lowered, and for subsequently restoring this transfer, this image sensor being characterized in that the control means are configured to perform a charge transfer, on the one hand, while the row electrodes are not undergoing any potential level switching, and on the other, while the electrodes of at least one of the ranks j=1 to j=p undergo a level switching during a column charge transfer operation.

According to the invention, the transfer by the read register can be continued during the whole time where the various electrodes of rank j=1 to p undergo switching operations (except during the time where the potential barrier under the transfer electrode is lowered). It may even be continued during part of the time where the electrodes of rank 1 of the matrix are at a high potential level, as long as however the electrode for transfer between matrix and read register receives a command authorizing the transfer of charges from the matrix to the register for a time that is shorter than the rise time to the high potential of the rank 1 electrodes. The high potential applied to an electrode is that which defines the lowering of a potential barrier or the creation of a potential well under this electrode; the low potential is that which raises a potential barrier or causes the base of a potential well formed under the electrode to be raised again.

It is therefore preferred that the transfer electrode be controlled by a control signal that is not the same as that controlling the electrodes of rank 1 (but which start and finish while the electrodes of rank 1 are at the high potential).

The electrode of rank p of the last row of the matrix, that which is adjacent to the transfer electrode, can be provided with a larger surface area than the other electrodes of rank p of the matrix, in order to be able to store all of the charges under this electrode. It is also preferable that it be controlled by a signal independent from that of the other electrodes of same rank p. This electrode and the transfer electrode are preferably fabricated with a lower resistivity than the other row electrodes of the matrix (in practice, they are made of polycrystalline silicon doubled up with a layer of aluminum) in order to allow a high-speed control.

Lastly, the output of the read register leads to a read circuit that in principle comprises a charge/voltage converter (essentially formed by a simple read diode collecting the charges from the register) and an amplifier fabricated on the same integrated circuit chip (made of silicon) as the matrix, and it is proposed according to the invention that at least the amplifier be preferably physically configured so as to be decoupled from the body of the integrated circuit substrate. Indeed, the body of the integrated circuit substrate tends to be subject to variations in potential when the array of N rows of p electrodes switches, and these substrate potential variations would be detrimental is they were retransmitted to the read circuit during the reading of the charges from the register.

Means for neutralizing the effect on the amplifier of the potential variations of the silicon during the potential level switching of the row electrodes of the matrix are therefore provided. These means comprise, for example, an electrode formed on the same substrate face as the matrix electrodes, this electrode surrounding the amplifier, and means for connecting this electrode to a fixed ground potential. These neutralization means may also comprise a trench in the silicon around the amplifier and means for connecting the portion of substrate surrounded by this trench to a fixed ground potential.

The invention is particularly advantageous for large format matrices, with a very large number of rows and columns, because the capacitive coupling is very large in this case, and especially those matrices that operate in a charge integration mode of the MPP type, which is a low-noise mode.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWNGS

Figure 3:
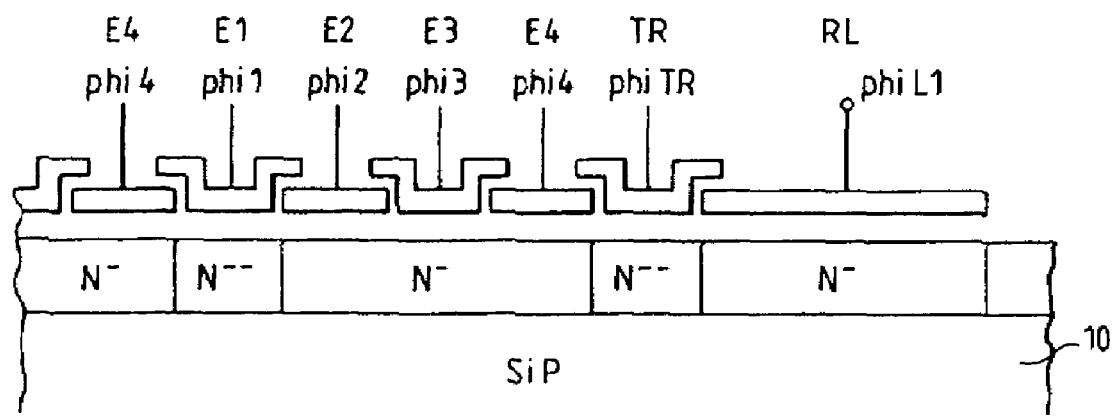
Figure 2:
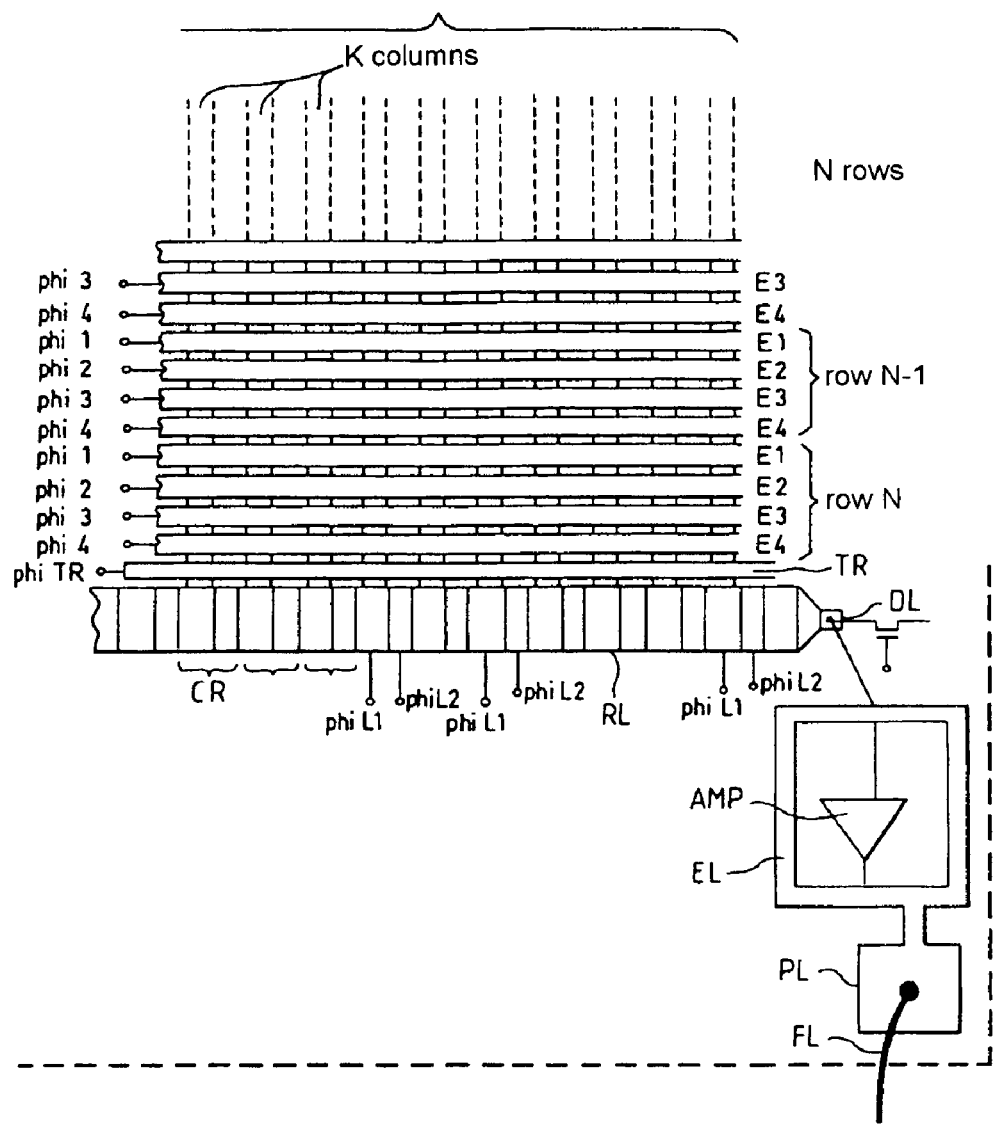
Figure 4:
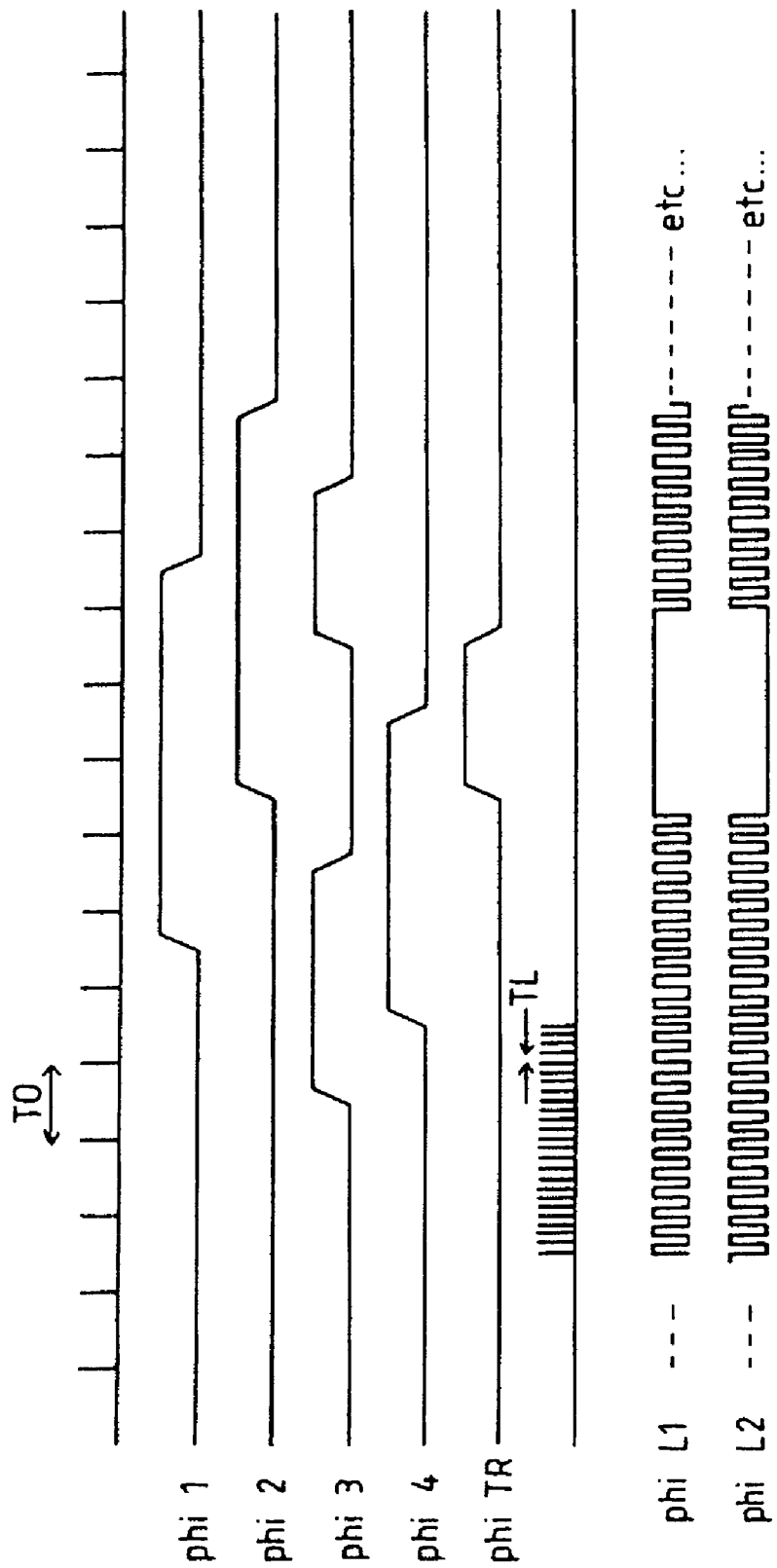

Other characteristics and advantages of the invention will become apparent upon reading the detailed description that follows and which is presented with reference to the appended drawings in which:

FIG. 1, already described above, shows a charge transfer timing diagram for a conventional picture capture matrix;

FIG. 2 shows a picture capture matrix according to the invention;

FIG. 3 recalls the structure, in cross section, of the row electrodes of the matrix;

FIG. 4 shows a charge read timing diagram for the matrix in FIG. 2.

DETAILED DECRIPTION OF THE INVENTION

FIG. 2 shows a partial view of a picture capture matrix, showing schematically the last two rows N-1 and N of the matrix, the electrode TR for transfer between the last electrode of the last row and the horizontal read register RL. The output of the read register leads to a read circuit comprising, in principle, a read diode DL and an amplifier AMP. The read diode, which is associated with a transistor for periodic reset, acts as a charge/voltage converter in order to transform each charge packet, fed into the diode by the read register as it advances step by step, into a voltage level proportional to the charge.

In the example shown, each row comprises four parallel electrodes of rank j=1 to j=4, which are E1, E2, E3 and E4, respectively, in the order from the farthest away to the nearest to the read register.

Between two successive column charge transfer operations, these electrodes are subjected to fixed potentials that allow local charges to be stored on each image dot at the intersection of a row and a column. Typically, (matrix designed to operate in MPP mode) the potentials applied to the four electrodes of a row are low potentials on the electrodes E1, as they are on the electrodes E2, E3 and E4, but the potential within the surface layer of N-type doped silicon, within which the charges are stored and propagate, is slightly lower under the electrodes E1; thus, a shallow, but wide, potential well is created under the electrodes E2, E3, E4, between the electrodes E1 of two successive rows, within which well the charges at the intersection of the row and the column remain accumulated for the interval of time separating two elementary column transfer steps.

FIG. 3 shows a cross-sectional view down a column of the conventional physical structure of the end of the column of a matrix, with a substrate of P-type silicon 10 and an N⁻type surface layer, less doped under the electrodes E1 and under the transfer electrode TR than under the electrodes E2, E3, E4, in order to create, for the same potential level under all the electrodes, a potential barrier under the electrodes E1 and TR which retains the charges stored under all of the electrodes E2, E3, E4, or in the register RL. It is furthermore recalled that a positive potential high level creates a deeper potential well, for negative charges, than does a low level.

The columns are separated by physical barriers (oxide and/or negatively doped regions) that isolate the negative charge packets stored in the various columns.

During an elementary transfer operation (transfer of charges from one row to the next), successive potential switching operations, that are identical for all the electrodes of same rank of the various rows of the matrix, are applied in order to progressively create a shift of charges from the electrodes E2, E3, E4 of one row (for example the row N-1) to the electrodes E2, E3, E4 of the next row (row N). The control signals phi1, phi2, phi3, phi4 of the respective electrodes E1, E2, E3, E4 are shown on the timing diagram in FIG. 4. These signals are schematically represented by logic high and low levels. The potential levels created within the silicon of the matrix under an electrode are not shown to avoid complicating the figures; it will be understood that these potential levels depend both on the level of potential applied to the electrode and on the doping of the silicon beneath the electrode. In the conventional case of the matrices operating in MPP mode, a potential well is created under the electrodes E2, E3, and E4, and a potential barrier is created around this well by the electrodes E1, while the potentials of the four electrodes are all at the low level.

The timing diagram in FIG. 4 shows:

on its left-hand side, where there is no switching of the signals phi1 to phi4, a wait phase which separates two successive column charge transfer operations;

in its central part, the switching of the signals phi1 to phi4 corresponding to a step for the transfer of charges from one row to the next and the last row towards the read register;

and, on its right-hand side, another period of waiting for a new step for the transfer of charges from one row to the next.

In the example of MPP matrix used, the step for transferring charges from one row to the next lasts for ten cycles of a base clock of period T0; the signals phi1 to phi4 are generated by a sequencer, not shown, that operates at the rhythm of this clock T0. The period T0 is typically around 2 microseconds for a matrix of 1000 rows capable of delivering an image in 1/30 of a second.

The timing diagram in FIG. 4 also shows the control signal phiTR for the transfer gate TR between the electrode E4 of the last row N and the read register RL. Conventionally, the transfer gate is controlled by the same signal phi1 as the electrodes E1 of the matrix. But, in the matrix according to the invention, the provision of a separate control signal phiTR for controlling this electrode is preferred; this signal phiTR lowers the potential barrier created, almost continuously, under the transfer electrode TR (barrier between the columns of the matrix and the read register); the time which the signal phiTR spends at the high level, during which the potential barrier is lowered, is preferably shorter than the duration of the signal phi1; the transfer electrode is furthermore controlled by a signal that does not originate from the amplifiers driving the electrodes E1, even if the pulse phiTR is identical to the pulse phi1. During the time that the pulse phiTR is at the high level, the charges can flow from the last row towards the read register RL.

The read register is conventionally organized with one stage per matrix column, two electrodes per stage, and two signals in phase opposition, phiL1 and phiL2, for the control of these electrodes. The charges are initially dumped under one of the electrodes (electrode controlled by the signal phiL1 in the example described and this is why phiL1 is at the high potential level for the duration of the pulse phiTR); then, when the read register is activated in read mode, the charges are shifted step by step horizontally under the next electrode (towards the right in FIG. 2), in step with the alternate switching of the phases phiL1 and phiL2, until they reach the read circuits.

The read circuits at the output of the read register conventionally comprise a charge/voltage converter and a voltage amplifier; the converter is composed, on the one hand, of the read diode DL, into which the charges arriving periodically at the rate of progression of the read register flow, and on the other, of a circuit for resetting the potential of the diode after each read operation.

The rate of advance of the read register (switching rate of the phases phiL1 and phiL2) is defined by a clock of period TL, much shorter than T0, and two clock pulses TL are required to make the charges advance by one stage, the read register being, in principle, a two-phase register.

During the transfer of charges from the columns towards the read register, the horizontal transfer of the charges into the read register is interrupted and, for this purpose, the signals phiL1 and phiL2 controlling the register are stopped. However, whereas conventionally the signals phiL1 and phiL2 were stopped (see FIG. 1) for the whole switching time of the phases phi1 to phi4 (10 clock pulses T0 in MPP mode), it is proposed, according to the invention, to only stop the switching of the phases phiL1 and phiL2 for a much shorter period of time which is the duration of the lowering of the potential barrier under the transfer electrode TR, in other words the duration of the pulse phiTR at the high level. This duration is from 1 to 3 times the period T0, or a maximum of 5 times T0 in the extreme case where the duration of the pulse phiTR is equal to that of the pulse phi1.

In the prior art, the interruption of the horizontal transfer could last around 20 microseconds for a period T0 of 2 microseconds. In the matrix according to the invention, the horizontal transfer is interrupted for a time which can be limited to 4 to 10 microseconds.

As an example, for 1000 columns at a horizontal timing period TL of 12.5 nanoseconds, hence 25 nanoseconds per horizontal transfer step, the unloading of the horizontal register RL takes 25 microseconds. The shift by one matrix row in the vertical transfer takes around 20 microseconds for a vertical clock period of T0=2 microseconds.

In total, the cycle time for reading one row therefore takes 45 microseconds if the horizontal read time and the row incrementation time in the column transfer are added together. With the invention, by limiting the time for which the horizontal transfer is interrupted to 2T0, or slightly more, i.e. around 4 to 5 microseconds, a total cycle time of 25+5 microseconds, equal to 30 microseconds, is found for the reading of a complete row instead of 45 microseconds.

Hence, in this example, a gain of 15 microseconds has thus been made, which is more than a 30% improvement in the read speed for the whole of the matrix.

If the MPP-type operation of the matrix is considered in more detail, the succession of the ten steps leading to an incrementation of one row in the column transfer for all the rows except the last (this will be described further on) is, in the order of implementation, as follows:

0. start with the signals phi1, phi2, phi3, phi4 at the low level; the photo-generated charges are stored under the electrodes E2, E3, E4 of the rows of the matrix;
1. rise of phi3, the charges are mainly concentrated under E3;
2. rise of phi4, the charges are mainly distributed under E3 and E4;
3. rise of phi1, the charges are distributed under E3, E4 and under the electrode E1 of the next row;
4. fall of phi3, the charges that were under E3 are concentrated under the electrode E4 and under the electrode E1 of the next row;
5. rise of phi2, the charges are mainly distributed between the electrode E4 and the electrode E2 of the next row;
6. fall of phi4, the charges are distributed under the electrodes E1 and E2 of the next row (from now on they are all under the electrodes of the next row);
7. rise again of phi3, the charges are under E1, E2, E3 (mainly E2, E3);
8. fall of phi1, the charges are mainly concentrated under E2 and E3;
9. fall of phi3, the charges are mainly concentrated under E2;
10. fall of phi2, the charges are distributed under E2, E3, E4 and the initial state is recovered, the charges having advanced by one row.

For the last row of the matrix, in the case where the signal phiTR goes up to and remains at the high level at the same time as phi1, the process is the following:

1. rise of phi3, the charges are mainly concentrated under E3;
2. rise of phi4, the charges are mainly distributed under E3 and E4;
3. rise of phi1 and of phiTR: lowering of the potential barrier between the electrode E4 and the read register; the charges present under E4 begin to flow into the register; new charges originating from the penultimate row can be received under E1;
4. fall of phi3, the charges that were under E3 are pushed towards the electrode E4 and from there continue to flow into the read register;
5. rise of phi2, no change except as regards the charges that arrived from the penultimate row, but these charges remain isolated from those that flow into the read register;
6. fall of phi4, the remainder of the charges under E4 finish flowing into the read register;
7. rise again of phi3, no change; the charges that arrived from the penultimate row are under E1, E2, E3;
8. fall of phi1 and phiTR; closing of the barrier between the columns and the read register; the charges that arrived from the last row are now mainly under E2, E3;
9. fall of phi3, the charges are mainly concentrated under E2; the barrier is closed;
10. fall of phi2, the charges are distributed under E2, E3, E4 and the initial state is recovered, the charges having advanced by one row; the barrier is closed.

But in the preferred solution, the pulse phiTR is shorter than the pulse phi1 and in this case the opening of the potential barrier between the columns and the read register can begin after step 3, for example at step 4 or step 5 (before the fall of phi4); the pulse phiTR can also fall again before step 8, preferably at step 7 (but the fall of phi4 must be awaited because the fall of phi4 is necessary in order to finish pushing the charges into the register). A good solution is the rise of phiTR at step 5 and the fall at step 7, with a duration of 2T0. However, the duration of the pulse phiTR can be further reduced to a value of around T0 if this pulse is started a half-period before step 6 (fall of phi4) and if it is terminated a half-period after this step 6.

Consequently and in summary, the sensor comprises means for:

lowering the potential barrier under the transfer electrode (TR) at the same time as or after the electrodes of rank 2 switch to a high logic level and while the electrode of rank 4 is at the high level, and for raising this potential barrier again before or at the same time as the electrode of rank 3 switches to a high logic level and when the electrode of rank 4 has returned to the low level.

In order to allow the timing diagram in FIG. 4 to be obtained in an optimal manner, it is desirable that the transfer electrode TR react very rapidly to the control signal phiTR when it rises or falls. It is therefore preferable that this electrode be more conducting than the other electrodes E1 to E4 of the matrix. For this purpose, whereas the electrodes of the matrix are generally fabricated from doped polycrystalline silicon, the electrode TR is designed to be doubled up with a layer of aluminum. The same thing is preferably also done for the electrode adjacent to it, namely the last electrode E4 of the last row N, and this electrode E4 is designed to be driven by an amplifier which is separate from the amplifier that drives all the electrodes E4 of the other rows. Thus, the electrode E4 of the last row will not be affected by the switching imprecision of the signals phi4; its switching will be better controlled and the timing diagram in FIG. 4 will be more easily adhered to; the charges present under the last electrode E4 will have time to flow into the read register despite the short time allotted to this transfer. This is the reason that the time allotted to the pulse phiTR can have a duration as short as T0.

It should be noted that all of the electrodes cannot be doubled up with a layer of aluminum because the aluminum masks the light and must therefore be used as little as possible in the active image capture region of the sensor; but it is acceptable to double up the last electrode E4 and the transfer electrode.

It may be desirable to give the last electrode E4 of the last row a larger width than the other electrodes E4 of the matrix in order to facilitate the storage of the charges completely under this electrode at step 4 before phiTR opens the barrier.

The invention is also applicable in the case where the pixels are regrouped two by two down a column (and, if required, along a row also) in order to accelerate the read operation at the expense of image resolution. In this case, two successive column transfer steps are carried out before the transfer gate is opened towards the read register. The charges from two successive rows accumulate under the last electrode E4 of the last row, which is wider than the other electrodes E4 of the matrix and which is controlled by a signal that switches to the high level only for the duration of the pulse phi4 of the second transfer step but not during the first. The electrode E4 of the last row is consequently not controlled by the same switching signal as the other electrodes E4 of the matrix. The transfer gate is open for a short time beginning before the end of the second pulse phi4 and ending after the end of this second pulse. Here again, the horizontal transfer is operative during the whole switching time of the potentials phi1 to phi4 of the two successive steps, except for the short period of time (which can be as short as 2T0 or even T0) during which the transfer gate opens the potential barrier that separates the matrix from the read register. The same solution is adopted for a column regrouping of 4 by 4 rows or 8 by 8 rows and the gain in time is even greater since now 16 or 32 T0 is required for the column transfer and an interruption of only 2T0 for the horizontal transfer.

In order to minimize the effect of the switching of control signals phi1, phi2, phi3, phi4 during the reading of the charges transferred horizontally by the read register towards the read circuit, decoupling means equivalent to a kind of shielding of the read circuit are provided.

The effect of the switching operations comes from the very large lines, which are capacitive in nature, that form the thousands of electrodes E1 to E4 of the matrix. The abrupt switching of the potential of these lines (all the lines of same rank simultaneously) induces, owing to its proximity, a modification in the potential of the substrate onto which the matrix is integrated. Although the substrate is grounded, generally via its rear face, the volume of the substrate cannot be completely held at ground potential, and the part of the substrate in the neighbourhood of the front surface (which is closest to the electrodes) sees its potential vary by capacitive coupling, and the read circuit is situated on the front face of the substrate.

It is therefore deemed desirable to provide means for reducing this substrate effect, which is particularly detrimental with the principle of the invention since the reading of the horizontal register takes place as switching operations on these large capacitive lines occur.

Preferably, the read circuit at the output of the register is surrounded by a front face electrode EL in direct ohmic contact with the substrate on which it lies, this electrode being designed to be connected to an electrical ground at zero volts potential (same potential as the rear face of the substrate). For example, the electrode PL is connected to a front face contact stud PL, and this contact stud can be connected to an external ground pin of the integrated circuit chip. In FIG. 2, an external connecting wire FL is shown soldered onto this stud and running towards a circuit pin connected to an electrical ground external to the chip. This pin or this wire are connected, outside of the chip, to the same ground as the rear face of the chip.

The portion of substrate surrounded by this substrate potential stabilization electrode is thus less subject to the substrate effect as the rest of the substrate. The electrode surrounds either the amplifier AMP or both the amplifier and the reset circuits of the read diode. The electrode either makes a point contact with the substrate from place to place or is in contact over its whole length. Typically, if the substrate is a p-type substrate, in which conventionally an n-type surface layer is provided everywhere where charges need to be carried, the electrode will have a continuous or a point to point connection to a $P^+$-type diffused region in contact with the P-type substrate.

If the read circuit amplifier has several stages, all the stages are preferably surrounded.

Another way of isolating the read circuit and making it independent of the substrate potential variations caused by the electrode switching operations consists in physically separating the portion of substrate carrying the read circuit from the portion of substrate carrying the matrix. This separation can be done by trenches in the case of matrices formed within a thin layer of silicon mounted onto a relatively insulating substrate. These trenches are made through the whole thickness of the silicon so as to form an island of substrate carrying the read circuit. The portion of substrate isolated by this trench is connected to a fixed ground potential (for example via the rear face of this portion of substrate). This island, separated from the main substrate carrying the electrodes of the matrix and held at ground potential independently from the rest of the substrate, is not affected by the potential variations of the main substrate during the potential switching operations on the electrodes of the matrix.

The invention can be applied to image sensors in which there are several read registers (two or four) associated with various parts of the matrix, or in which the register or registers have several outputs, the use of several registers or registers with several outputs contributing to a higher speed delivery of the whole image.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. An image sensor comprising a picture capture matrix having N rows and K columns of image dots, a read register at the free end of the K columns, and means for transferring, from one row to another and from the last row to the read register, charges corresponding to the image dots, with a transfer electrode between the last row of the matrix and the read register, each row of image dots comprising several electrodes of rank 1 to p, activated synchronously, such that the electrodes of the same rank j of all the rows are activated by the same periodic control signal, the electrode of rank p being, among the electrodes of the same row, that which is the closest to the read register, means for controlling the read register being provided for carrying out a transfer of charge from the register towards a read circuit, for interrupting this transfer while a potential barrier under the transfer electrode is lowered, and for subsequently restoring this transfer, this image sensor being characterized in that wherein the control means are configured to perform a charge transfer, on the one hand, while the row electrodes are not undergoing any potential level switching, and on the other, while the electrodes of at least one of the ranks j=1 to j=p undergo a potential level switching during a column charge transfer operation.

2. The image sensor as claimed in claim 1, wherein the register control means are designed to continue the transfer by the read register during the whole time where the various electrodes of rank j=1 to p undergo switching operations, except during the time where the potential barrier under the transfer electrode is lowered.

3. The image sensor as claimed in claim 2, wherein the register control means are configured to continue the transfer by the read register during part of the time where the electrodes of rank 1 of the matrix are at a high potential level.

4. The image sensor as claimed in claim 1, wherein the transfer electrode is controlled by a control signal (phiTR) that is not the same as that controlling the electrodes of rank 1.

5. The image sensor as claimed in claim 4, wherein the transfer electrode has a noticeably lower resistivity than the resistivity of the row electrodes of the matrix.

6. The image sensor as claimed in claim 1, wherein the electrode of rank p of the last row of the matrix, that which is adjacent to the transfer electrode, has a larger surface area than the other electrodes of rank p of the matrix.

7. The image sensor as claimed in claim 1, wherein the electrode of rank p of the last row of the matrix is controlled by a signal that is independent of that of the other electrodes of same rank p.

8. The image sensor as claimed in claim 7, wherein the electrode of rank p of the last row of the matrix has a lower resistivity than the other row electrodes of the matrix.

9. Image sensor as claimed in claim 1, wherein the output of the read register leads to a read circuit that comprises an amplifier fabricated on the same silicon integrated circuit chip as the matrix, and means for neutralizing the effect of the variations in potential of the silicon on the amplifier during the potential level switching of the row electrodes of the matrix.

10. The image sensor as claimed in claim 9, wherein the means for neutralizing the effect of the potential variations comprise an electrode formed on the same substrate face as the electrodes of the matrix, this electrode surrounding the amplifier, and means for connecting this electrode to a fixed ground potential.

11. The image sensor as claimed in claim 9, wherein the means for neutralizing the effect of the potential variations comprise a trench in the silicon around the amplifier and means for connecting the portion of substrate surrounded by this trench to a fixed ground potential.

12. The image sensor as claimed in claim 1, wherein the matrix is a matrix of the MPP type comprising four parallel electrodes per row activated according to a succession of ten phases for the transfer of one step down a column.

13. The image sensor as claimed in claim 12, wherein it comprises means for lowering a potential barrier under the transfer electrode at the same time as, or following, the switching of the electrodes of rank 2 to a high logic level and while the electrode of rank 4 is at the high level, and for raising this potential barrier again before, or at the same time as, the electrode of rank 3 goes to a high logic level and when the electrode of rank 4 has returned to the low level.

14. The image sensor as claimed in claim 1, wherein it comprises means for successively performing two charge transfers from one row to the next without transferring charges from the last row towards the read register, and means for lowering a potential barrier under the transfer electrode only at the end of the second transfer of charges.

* * * * *